A. R. FRANK.
METHOD OF PRODUCING NITROGEN COMPOUNDS FROM CARBIDS.
APPLICATION FILED MAR. 13, 1907.
1,006,927.
Patented Oct. 24, 1911.
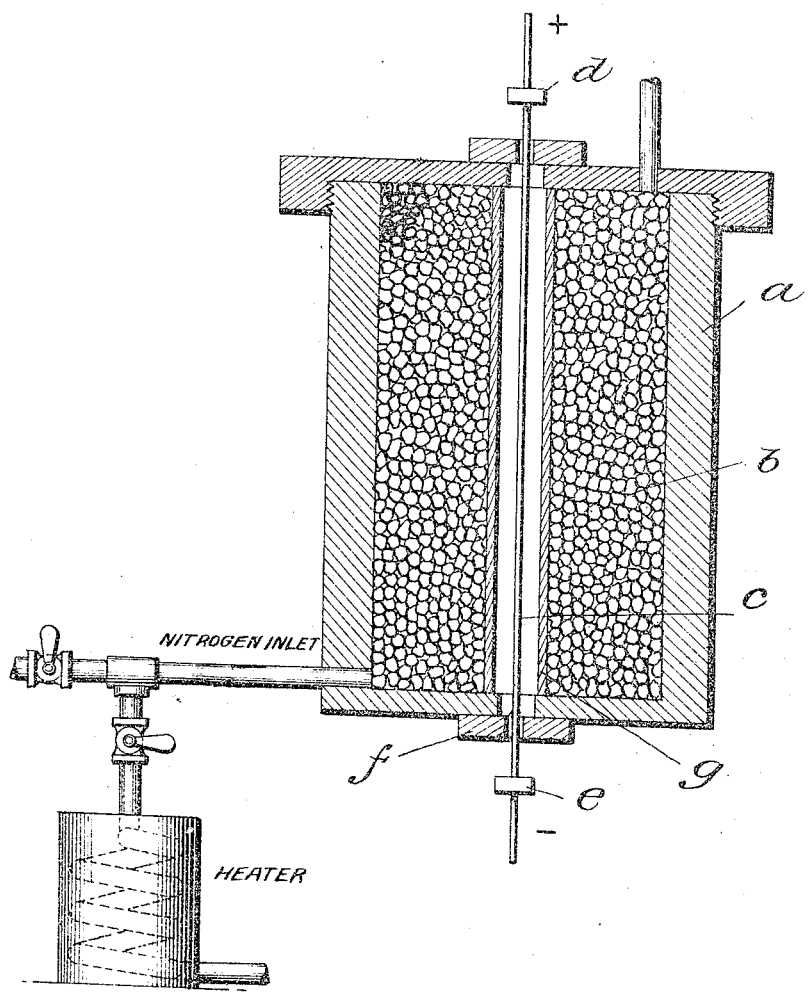

UNITED STATES PATENT OFFICE.

ALBERT R. FRANK, OF HALENSEE, NEAR BERLIN, GERMANY, ASSIGNOR TO SOCIETÀ GENERALE PER LA CIANAMIDE, OF ROME, ITALY, A CORPORATION OF ITALY.

METHOD OF PRODUCING NITROGEN COMPOUNDS FROM CARBIDS.

1,006,927.  Specification of Letters Patent.  Patented Oct. 24, 1911.

Application filed March 13, 1907. Serial No. 362,086.

*To all whom it may concern:*

Be it known that I, ALBERT R. FRANK, a subject of the German Emperor, and resident of Halensee, near Berlin, Germany, have invented a certain new and useful Improvement in Methods of Producing Nitrogen Compounds from Carbids, of which the following is a specification.

The present invention relates to a method of producing nitrogen compounds from carbids such for instance as cyanamids (carbodiimids) cyanids, nitrids, and other like compounds, as applied to the production of which the process would be illustrated by the formulæ

$$CaC_2 + 2N = CaCN_2 + C;$$
or
$$BaC_2 + 2N = BaC_2N_2;$$
or
$$3MgC_2 + 2N = Mg_3N_2 + 6C.$$

In the production of nitrogen compounds by the  .   ction of nitrogen with carbids, as for example, the carbids of the alkalis or alkaline earths, it has been ascertained that it is not necessary for the process that the entire mass of the carbid be brought to the temperature necessary for the reaction; but that it suffices if this temperature be produced at one place in the mass, the reaction then proceeding or continuing, under suitable conditions of nitrogen supply, spontaneously throughout the entire mass; a preliminary condition however is that the reaction temperature be actually attained at this one place.

In accordance with the present invention the process may be carried out in several ways, of which the following are examples: The ignition at one place may be produced by any convenient form of igniter which will raise the temperature at that place to the temperature of the reaction, that is to say to a temperature lying between about 800° to 1100° C., whereupon the reaction will proceed without the application of further heat.

The ignition may be accomplished, for example, by means of an electric heater or resistor in the form of a carbon body, or a metallic conductor or semi-conductor placed in a heat-insulated receptacle containing the carbid. The heater is then raised to or above the reaction temperature by turning on the electric current. The nitrogen being brought into contact with the carbid in the receptacle, the reaction proceeds from the region of the heater until the entire mass of the carbid is converted into the desired nitrogen compound. If the heat insulation of the receptacle be sufficiently effective, the current may be switched off after the reaction has commenced; but if said insulation be not sufficiently effective, heat may be applied, through the resistor or otherwise, during the entire period of the reaction to compensate for the loss of heat.

As an illustration of one method of carrying out my invention, I will select the production of calcium cyanamid ($CaCN_2$) from calcium carbid ($CaC_2$) and nitrogen (N), following the reaction, $$CaC_2 + 2N = CaCN_2 + C,$$

which may be carried out as follows: Into a suitable receptacle, (preferably closed) constructed of material of low heat conductivity, provided with means for introducing nitrogen and containing electrical means of developing a temperature lying between dark red and light yellow, I introduce the desired quantity, say 100 k. g., of finely divided calcium carbid. A small portion of the carbid immediately adjacent to the electrical heat-developing means, is first raised to the temperature required to initiate the reaction at that point, between the carbid and the nitrogen then or previously introduced, and the process of conversion starts. The supply of nitrogen being maintained, the heat spontaneously resulting from the reaction between the carbid and nitrogen at this initial stage which we may call the ignition stage of the process is transmitted to that portion of the mass immediately surrounding the initially heated portion, and is sufficient to promote the reaction in said surrounding portion and there develop a new supply of heat, which, transmitted to an area still more remote from the ignition point is sufficient to promote the reaction there; and so the reaction continues to spread until conversion of calcium carbid into calcium cyanamid is effected throughout the entire mass. This result will be recognized from the cessation in the consumption of nitrogen, which may be observed in any well known manner.

Referring to the accompanying drawings forming a part of this specification in which the figure is a diagrammatic sectional view of an apparatus suitable for carrying out this invention, $a$ represents any suitable receptacle, $b$ the material to be acted upon by nitrogen, $c$ any suitable means for heating said material, for example, a resistor through which a current may be passed; $d$ the positive terminal of a work circuit; $e$ the negative terminal; $g$ a tube or other receptacle through which the resistor $c$ may pass, and $f$ any suitable closures for said receptacle.

The invention may also be carried out by bringing the carbid reduced to a finely divided state, and either cold or moderately heated, into contact with highly heated nitrogen; under these conditions the carbid becomes incandescent and reacts with the nitrogen, the supply of which is maintained, the process proceeding as before described. The nitrogen may also be supplied at a pressure above that of the atmosphere or at atmospheric pressure, or it may be drawn into the receptacle at a pressure below that of the atmosphere.

In all cases the carbids may be employed either in the pure state or as commercial carbids or mixed with other materials, particularly with such materials as effect a loosening of the carbid mass, such, for instance, as carbonaceous materials which by becoming carbonized form channels or pores in the mass, which channels or pores enable the nitrogen to penetrate readily and completely all the portions of the mass. The carbid may be employed either in the powdered state or broken into lumps. Further, the carbid employed need not be completely formed carbid but may be employed in the form of its components, as, for example, a mixture of oxids, carbonates or other salts of alkalis or alkaline earths and carbon or any carbonaceous substances; or as a mixture of metals and carbon or substances derived from carbon with or without the addition of other organic or inorganic substances, provided these components do not contain compounds having a temperature of decomposition which in itself or in reaction with the other components is higher than the temperature of reaction when nitrogen acts on carbids.

It is to be clearly understood that the word "carbid" as used in this specification and in the claims, signifies and includes not only all pure carbids as such but also carbids in the form of their components, such as a mixture of oxids or other salts or metals with carbonaceous material, as indicated above.

The nitrogen employed may be either nitrogen as such or nitrogen in a combined state, such, for example, as ammonia, provided the temperature at which the nitrogen compound decomposes be lower than the temperature of reaction when nitrogen acts upon carbid.

It is also to be understood that the word "nitrogen" as used in this specification and in the claims specifies and includes not only pure nitrogen as such, but nitrogen mixed with other gases, vapors or substances and nitrogen in the combined state, as ammonia, for example.

I am aware that nitrogen compounds have hitherto been produced from carbids by the action of nitrogen upon carbids and I therefore do not claim such method or process broadly, but

What I claim is:—

1. The process of making compounds of nitrogen by reacting on carbids with nitrogen at a suitable temperature, which consists in heating a relatively small part of the carbid mass to a reacting temperature, supplying nitrogen as the reaction proceeds, thereby continuing the reaction throughout the mass to be converted.

2. The process of making compounds of nitrogen by reacting on carbids with nitrogen at a suitable temperature, which consists in initiating the process by physically heating a relatively small part of the carbid mass to a reacting temperature, supplying nitrogen as the reaction proceeds, thereby maintaining the temperature and continuing the reaction throughout the mass to be converted.

3. The process of making compounds of nitrogen by reacting on carbids with nitrogen at a suitable temperature, which consists in bringing a relatively small part of the carbid mass in a finely divided condition into contact with heated nitrogen to heat said carbid to the reaction temperature, supplying nitrogen as the reaction proceeds, thereby maintaining the temperature and continuing the reaction throughout the mass to be converted.

4. The process of making compounds of nitrogen by reacting on carbids with nitrogen at a suitable temperature, which consists in heating a relatively small part of the carbid mass to a reacting temperature, supplying nitrogen at a pressure above that of the atmosphere as the reaction proceeds, thereby maintaining the temperature and continuing the reaction throughout the mass to be converted.

5. The process of making compounds of nitrogen by reacting on carbids with nitrogen at a suitable temperature, which consists in mixing with the carbid a carbonizable material to form channels or pores in the carbid mass, heating a relatively small part of the carbid mass to a reacting temperature, supplying nitrogen as the reaction proceeds, thereby maintaining the temperature and continuing the reaction throughout the mass to be converted.

In testimony whereof I have signed my name to this specification in the presence of the two subscribing witnesses.

ALBERT R. FRANK.

Witnesses:
 WOLDEMAR HAUPT,
 HENRY HASPER.